Patented Sept. 12, 1939

2,172,969

UNITED STATES PATENT OFFICE 2,172,969

PROCESS FOR OBTAINING SILICON FROM ITS COMPOUNDS

Josef Eringer, Munich, Germany

No Drawing. Application October 1, 1937, Serial No. 166,835. In Germany September 28, 1936

3 Claims. (Cl. 23—209)

This invention relates to a process for obtaining silicon from its compounds and has for its chief object the provision of a process for obtaining silicon from silicofluorides.

A further object of the invention is to provide a process by means of which silicon can be obtained substantially free from impurities and more particularly from silicic acid.

It has been found that silicon, to all intents and purposes free from silicic acid, can be obtained when silicon fluoride is converted to silicon with the aid of an electric-positive metal, either in the presence of an inert gas such as, for example, nitrogen or argon, or alternatively in vacuo. For this purpose silicon fluoride is acted upon in a crucible with an electro-positive metal or with a mixture of such metals, de-oxidising metals in the form of gauze or wool being preferably placed in the upper space of the crucible and heated electrically.

As the action takes place with extreme rapidity at a temperature of about 500° C., it causes an appreciable increase of pressure which forces the air above the reaction mixture through the glowing gauze. During this process the oxygen present in the air is retained in the form of the corresponding metallic oxide, so that only nitrogen and small quantities of argon and of other gases occurring in the air are present in the reaction space.

The air which enters after the reaction has taken place must also pass through the glowing metallic gauze, and a further de-oxidation takes place. As the temperature remains below 1000° C. during the reaction, the nitrogen which is left behind in this process has no injurious influence upon the reaction product.

The reaction product obtained in this way and reduced to a state of fine division is then heat treated with a corresponding quantity of concentrated or dilute sulphuric acid, whereby the metallic fluoride produced in the first reaction is decomposed into hydrogen fluoride and the corresponding metallic sulphate, while the silicon remains in amorphous form.

The hydrogen fluoride liberated by the treatment with sulphuric acid destroys any silicic acid or silicates that may still be present, and can then be used again or immediately converted into hydrofluoric acid or metallic fluorides.

The following is an example of the process.

38 grammes of sodium silico-fluoride are mixed with 18 grammes of sodium in powder form and placed in a crucible which can be heated and in the upper part of which two pieces of copper wire gauze are placed parallel to each other. The space between the pieces of gauze, which can also be heated, is filled with copper wool. When the crucible has been filled and closed it is heated to about 500° C. At this temperature reaction takes place and silicon and sodium fluoride are formed, whereby the silicon which is mechanically expelled by the sudden increase in pressure is collected in chambers or towers connected to the furnace.

The equation of the reaction is as follows:

$$Na_2SiF_6 + 4Na = Si + 6NaF$$

or this can be expressed:

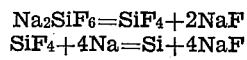
$$Na_2SiF_6 = SiF_4 + 2NaF$$
$$SiF_4 + 4Na = Si + 4NaF$$

After the reaction product has been cooled at least to 200° C. it is finely divided and is treated with water or better still heat-treated with dilute 1:1 sulphuric acid whereby on the hydrogen fluoride being liberated, (which latter can then be made into hydrofluoric acid or a metallic fluoride) metallic sulphates are produced, while the silicon separates out on the surface in amorphous form as a shining metallic froth.

The equation of the reaction is as follows:

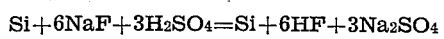
$$Si + 6NaF + 3H_2SO_4 = Si + 6HF + 3Na_2SO_4$$

After the silicon has been separated from the metallic sulphate solution, it is again washed and is dried at 80° C. The silicon obtained in this way is in the form of an impalpable, reddish or grey-brown powder, which discolours strongly, and which, even if the raw products were impure, contains a minimum of 96–97% silicon. The yield amounts to about 87% of the theoretically possible yield.

What I claim and desire to secure by Letters Patent of the United States is:

1. Process for the recovery of silicon from silicofluoride compounds comprising mixing said compounds with at least one finely divided metal being more electropositive than silicon, reacting said mixture at a temperature between 500 and 1000° C. in a nitrogen atmosphere, treating the reaction product with acid in order to decompose the produced metal fluoride and separating out the silicon as an amorphous powder containing approximately 96 to 97% Si, the yield of the reaction being approximately 87% of the theoretical yield.

2. Process for the recovery of silicon from silicofluoride compounds comprising mixing said compounds with at least one finely divided metal being more electropositive than silicon, reacting said mixture at a temperature between 500 and 1000° C. in a nitrogen atmosphere, treating the reaction product with acid in order to decompose the produced metal fluoride and to form hydrofluorine acid, separating out the silicon on the surface of the treated mass as an amorphous powder containing approximately 96 to 97% Si and converting said hydrofluorine acid into silico fluorine compounds.

3. Process for the recovery of silicon from silicofluoride compounds comprising mixing said compounds with finely divided sodium, reacting said mixture at a temperature between 500 and 1000° C. in a nitrogen atmosphere, treating the reaction product with acid in order to decompose the produced metal fluoride and separating out the silicon as an amorphous powder containing approximately 96 to 97% Si, the yield of the reaction being approximately 87% of the theoretical yield.

JOSEF ERINGER.